3,004,064
SEPARATION OF NITROGEN ISOTOPES

Karl Erik O. Holmberg, Stockholm, Sweden, assignor to Quartz & Silice S.A., Paris, France, a corporation of France
No Drawing. Original application June 15, 1953, Ser. No. 361,858. Divided and this application Oct. 2, 1957, Ser. No. 687,603
3 Claims. (Cl. 260—501)

For the concentration of isotopes of certain light elements chemical exchange processes have often been used. In chemical reactions isotopes usually react with slightly different velocities and consequently in an equilibrium reaction the equilibrium constant differs a little from 1 and thus the isotope percentage can be a little different in the two chemical species. A well known example is the equilibrium between ammonia and ammonium ion:

$$N^{15}H_3 + N^{14}H_4^+ \rightleftharpoons N^{14}H_3 + N^{15}H_4^+$$
(gas) (sol.) (gas) (sol.)

with the equilibrium constant 1.031
i.e.

$$\frac{(N^{14}H_3)(N^{15}H_4^+)}{(N^{15}H_3)(N^{14}H_4^+)} = 1.031$$

The simple process separation factor, $\alpha$, is given by the ratio between the isotope ratios in the two compounds, in this case $$\alpha = \frac{(N^{15}/N^{14})NH_4 + \text{solution}}{(N^{15}/N^{14})NH_3 \text{ gas}} = 1.031$$

The $NH_4^+$ ion phase, thus, is a little enriched in the heavy nitrogen isotope.

To have a useful enrichment it is necessary to multiply the simple process separation factor, which has hitherto usually been done by means of a column process. An ammonium salt solution is flowed down a packed column, is mixed with NaOH solution, then $NH_3$ is driven out completely by boiling and caused to flow up the column in countercurrent to the ammonium salt solution whereby an exchange occurs so that $N^{15}$ goes to the solution and is concentrated at the bottom of the column. The $NH_3$ gas passing from the top of the column may be discarded or it may, by addition of acid, be converted to ammonium salt solution, which is again passed down the column, and the supply of fresh ammonium salt solution may be reduced correspondingly. After some time the column attains equilibrium, when the percentage of $N^{15}$ at the bottom of the column no longer increases, and then or a little earlier material enriched in $N^{15}$ may be withdrawn. The percentage of $N^{15}$ depends on the number of theoretical plates ($n$) of the column under the prevailing conditions. It is possible to define a total separation factor R as follows:

$$R = \frac{(N^{15}/N^{14}) \text{ bottom}}{(N^{15}/N^{14}) \text{ top}} \alpha = n$$

The transport of $N^{15}$ through the column is determined by the difference in $N^{15}$ concentration of the ammonium salt solution and of the ammonia gas at the top. For an isotope with a low concentration, N, where N is the mole fraction of the said isotope in the element, the net transport, T, of that isotope through the column is given by the formula:

$$T = L(\alpha - 1)N$$

where L is the total flow of the element through the column. L and T may both be expressed in moles per unit time. The total flow, L, is many times the transport, since $\alpha$ is always near one, and consequently large amounts of chemicals are consumed.

Other well known exchange reactions are

Between HCN and CN⁻ for concentration of $C^{13}$____ $\alpha = 1.012$
Between $CO_2$ and $HCO_3^-$ for concentration of $C^{13}$____ $\alpha = 1.012$
Between $SO_2$ and $HSO_3^-$ for concentration of $S^{34}$____ $\alpha = 1.019$
Between $H_2O$ and $CO_3$ for concentration of $O^{18}$____ $\alpha = 1.039$ A more detailed description of exchange reactions is given in "Preparation and Measurements of Isotopic Tracers" by D. Wright Wilson, A. O. C. Nier and Stanley P. Reimann, J. W. Edwards, Ann Arbor, Michigan 1946, pp. 1–10, and the references given there, p. 10.

Another isotope separation method is the fractional distillation, which can be used in favourable cases. It is simple to perform and does not consume large amounts of chemicals but chiefly heat energy. A drawback is that the simple process equilibrium factors are small, seldom more than 1.005, and thus very large columns are needed to bring about a more considerable enrichment and transport. Known examples are distillation of water for concentration of $O^{18}$ ($\alpha = 1.004$ at 100° C. and $\alpha = 1.007$ at 50° C.) and distillation of carbon monoxide for concentration of $C^{13}$ ($\alpha = 1.011$ at −202° C.).

The present invention relates to a new method of isotope separation which can suitably be named "exchange distillation" since it can be regarded as a combination of the exchange process and fractional distillation giving the advantage of good separation factors like the exchange process without the high consumption of chemicals characteristic of this process in combination with the simple apparatus and handling of the distillation process.

In order to obtain these results the invention consists in performing a countercurrent exchange reaction between a compound A containing the element the isotopes of which are to be separated and a compound AB which on heating to a suitable temperature dissociates reversibly giving gaseous A and a compound B which may be gaseous or not. The process is performed in the following way. A liquid phase containing AB is flowed in one direction along a cascade (e.g. a distillation column). If AB is solid it may be obtained in liquid phase by addition of a solvent C. At one end of the cascade AB is dissociated by heating giving gaseous A which is flowed in the opposite direction along the cascade countercurrently to the liquid. B may have such a volatility that all of it follows A in the gas phase. If not it is stripped of A and is delivered separately to the opposite end of the cascade in which end A and B are recombined to AB by cooling. If a solvent has been added it may be so volatile as to follow A and B in the gas phase or else after stripping it may be recirculated to the other end of the cascade. It is thus possible to perform a chemical exchange process in a way similar to a distillation. Isotopically enriched fractions are obtained from the ends of the cascade, and the process may be performed discontinuously like a batch distillation or continuously like a continuous distillation.

On account of the reversible equilibrium AB A+B the liquid phase will contain at least small amounts of A and B in a free form, in the same way the gas phase may contain undissociated AB. The only essential condition is that the relative amounts of A and AB are amply different in gas and liquid phase.

The separation factors of exchange reactions are generally more favourable at low temperatures. It is thus often preferable to perform the exchange distillation at a low temperature, that is under a moderate vacuum. If the compound AB at its melting point has a vapor pressure over atmospheric pressure it is often preferable to perform the exchange distillation at atmospheric pressure or lower and to use a solvent to obtain AB in liquid phase.

Below there are given some examples of exchange distillations according to the invention.

(1) AB is decomposed by heating and the more volatile compound A leaves the less volatile B as a gas. From the bottom of the column the component B may be recirculated to the top and flowed down the column in countercurrent to the gas or vapour A.

*Example.*—A=$BF_3$, B=anisole.

(2) If the compound AB is solid and thus cannot flow through the column, there is added a compound C which gives with AB a solution or a liquid compound and which can be less volatile than AB or can distill together with AB. In this case C is recirculated through the column in the same way as compound B in the preceding example.

*Example.*—A=$NH_3$, B=$CO_2$, C=$H_2O$.

(3) If in example 1B or AB is solid, there is added a compound C as a solvent. Particularly B+C may be a buffer solution from which A can be driven out by heating. B+C are then recirculated through the column as in Example 1.

*Example.*—A=$NH_3$, B=$NaH_2PO_4$ +$Na_2HPO_4$, C=$H_2P$

Practical example

Trimethylamine (about 20%)+acetic acid (about 80%) were distilled in a column of about 30 theoretical plates at 40 mm. Hg to near equilibrium. $N^{15}$ concentrated at the bottom with the separation factor F=1.48.

This application is a division of applicant's copending application Serial No. 361,858, filed June 15, 1953, now abandoned.

I claim:

1. A method of separating nitrogen isotopes by means of a chemical exchange process between two compounds containing the isotopes to be separated, comprising the steps of combining trimethylamine containing the isotopes to be separated with acetic acid to form a dissociable compound in a liquid phase, passing said liquid phase downwardly through a distillation column, heating said liquid phase in the bottom of said column to liberate vapors of trimethylamine, passing said vapors upwardly in said column in countercurrent contact with said liquid phase, and removing product containing said vapors enriched in one of the nitrogen isotopes from the top of the column, and removing product containing said dissociable compound enriched in a second nitrogen isotope from the bottom of the column.

2. A method of separating nitrogen isotopes by means of a chemical exchange process between two compounds containing the isotopes to be separated, comprising the steps of combining trimethylamine containing the isotopes to be separated with acetic acid to form a dissociable compound in a liquid phase, passing said liquid phase downwardly through a distillation column, heating said liquid phase in the bottom of said column to liberate vapors of trimethylamine, passing said vapors upwardly in said column in countercurrent contact with said liquid phase, and removing product containing trimethylamine enriched in one of the nitrogen isotopes from the top of the column, and removing product containing trimethylamine enriched in a second nitrogen isotope from the bottom of the column.

3. A method of separating nitrogen isotopes by means of a chemical exchange process between two compounds containing the isotopes to be separated, comprising the steps of combining trimethylamine containing the isotopes to be separated with acetic acid to form a thermally dissociable compound in a liquid phase, passing said liquid phase downwardly through a distillation column, heating said liquid phase in the bottom of said column to liberate vapors of trimethylamine and acetic acid, passing said vapors upwardly in said column in countercurrent contact with said liquid phase, cooling said vapors at the top of said column to form dissociable compound to continue the process, and removing product enriched in one of the nitrogen isotopes from the top of the column, and removing product enriched in a second nitrogen isotope from the bottom of the column.

References Cited in the file of this patent

UNITED STATES PATENTS

| 2,204,072 | Dean | June 11, 1940 |
| 2,796,330 | Crist et al. | June 18, 1957 |

OTHER REFERENCES

Urey et al.: in "Journ. Chemical Physics," vol. 5, 1937, pages 856–868.

Kirshenbaum et al.: "New Data Relating to the Separation of the Nitrogen Isotopes by the Exchange Reactions Between Ammonia and Solutions of Ammonium Nitrate," AEC Pub. MDDC–412, pages 1–3, Oct. 15, 1946.

Urey and Thode: "The Further Concentration of N–15," J. Chem. Phys. 7, 34–39 (1939).